(12) United States Patent
Liang

(10) Patent No.: US 6,913,039 B2
(45) Date of Patent: Jul. 5, 2005

(54) VALVE CONFIGURATION OF AN AIR PRESSURE STEEL JAR OF A PAINT BALL GUN

(76) Inventor: Guodong Liang, P.O. Box No. 6-57, Chung-Ho, Taipei 235 (TW)

( * ) Notice: Subject to any disclaimer, the term of this patent is extended or adjusted under 35 U.S.C. 154(b) by 175 days.

(21) Appl. No.: 10/024,232

(22) Filed: Dec. 21, 2001

(65) Prior Publication Data

US 2003/0116189 A1 Jun. 26, 2003

(51) Int. Cl.$^7$ .................... F41B 11/00; F16K 17/16
(52) U.S. Cl. .................... 137/587; 137/68.23; 251/144; 251/264; 124/74
(58) Field of Search .................. 137/68.23, 587, 137/588, 590; 251/264, 144; 124/73, 74

(56) References Cited

U.S. PATENT DOCUMENTS

| | | | | | |
|---|---|---|---|---|---|
| 310,648 A | * | 1/1885 | Chamberlain | ................ | 124/73 |
| 756,346 A | * | 4/1904 | Farrell | ......................... | 251/264 |
| 1,110,057 A | * | 9/1914 | Helberg | ...................... | 251/144 |
| 1,457,743 A | * | 6/1923 | Morris | ........................ | 251/144 |
| 1,520,285 A | * | 12/1924 | Entwisle et al. | ............ | 251/144 |
| 4,799,646 A | * | 1/1989 | Rollett | ........................ | 251/264 |
| 5,143,256 A | * | 9/1992 | Wadensten | ................... | 251/144 |
| 6,405,722 B2 | * | 6/2002 | Colby | ......................... | 124/74 |
| 6,539,969 B1 | * | 4/2003 | Sullivan | ...................... | 124/74 |

* cited by examiner

*Primary Examiner*—John Rivell
(74) *Attorney, Agent, or Firm*—Troxell Law Office, PLLC

(57) ABSTRACT

A valve configuration of an air pressure steel jar of a paint ball gun, more specifically, a valve configuration comprises a manual wheel disposed at the bottom end of the air pressure steel jar; the said manual wheel directly links a valve needle to work a valve seat axially disposed inside the steel jar; the said valve seat, via a conduct hole, directly conducts the gas pressure therein to the bore of the paint ball gun for application; a fuse manner of using a forced band fuse is disposed at the rear lateral end of the said manual wheel, relative to the valve needle, for the steel jar to obtain safe guarantee of pressure load.

6 Claims, 4 Drawing Sheets

VALVE CONFIGURATION OF AN AIR PRESSURE STEEL JAR OF A PAINT BALL GUN

BACKGROUND OF THE INVENTION

The air pressure steel jar of a paint ball gun is connected to the bore (110) of the paint ball gun in any manner, as shown in FIG. 1; the rear end of the bore (110) disposed inside the said paint ball gun (1) connects a steel jar (2); the steel jar (2) situates inside a butt (11) and communicates with the bore (110) by means of a butt joint portion (12) of the steel jar (2) to make the bore (110) obtain air pressure as the pressure base for discharging the paint ball; however, the general application of the air pressure steel jar (2) is to recycle the steel jar (2) and refill the nitrogen, therefore, the steel jar (2) needs have an on/off valve disposed for filling the gas and conducting the in/out control in dual directions.

Referring to FIGS. 2 and 3 for the conventional parts, FIG. 2 is a drawing of a general steel jar (2) with a rotating valve (13) disposed at the butt joint portion (12); the rotating valve (13) works as the base for controlling the on/off communication between the steel jar (2) and the outside; the rotating valve (13) plugs a through hole by screwing to lock and to form a closed state; since the said rotating valve (13) is disposed in the lateral aspect of the butt joint portion (12) and, in order to obtain the effect of virtual reality, the newly made paint ball gun has the steel jar directly hidden inside the butt (11); in that case, the rotating valve (13) is unable to provide external operation, as shown in FIG. 3; therefore a resilient press lock button (14) is disposed directly on the said butt joint portion (12); the said press lock button (14) is a resilient button; when the button is pressed in, a spherical valve disposed therein is pushed away to make the inside of the steel jar (2) communicate outward so as to provide dual directional operations of filling the gas and conducting out the pressure; the press lock button (14) is disposed in a manner of utilizing the requirement of the bore (110) of the paint ball gun to have a push tenon with a convex shoulder for pressing and pushing away the said press lock button (14); however, the said assembly method utilizes the requirements of the insert joint tenon (140) disposed relatively to the outer circumference of the press lock button (14) to have tight match with the inside of the bore (110) for preventing the gas leak and reaching a tight seal with the filling nozzle for preventing the situation of gas leak; furthermore, the general paint ball gun is provided for warlike games, it is quite often that the paint ball gun will be carried and shaken; the assembly between the bore (110) and the said press lock button (14) frequently vibrates and causes gas leak at the joint area of the said valve (13); in addition, during the filling procedure, the traditional steel jar (2) may burst due to being unable to bear the inner pressure if the pressure from the pressure source is too big; therefore, the present invention has the said valve (13) designed for a convenient manual operation and to have a fuse effect.

SUMMARY OF THE INVENTION

The present invention relates to a valve configuration of an air pressure steel jar of a paint ball gun, more specifically to a valve configuration provided for a discharging pressure steel jar of a paint ball gun; mainly a manual wheel is disposed at the bottom end of the air pressure steel jar; the said manual wheel directly links a valve needle to work on a valve seat axially disposed inside the steel jar; the said valve seat, via a conduct hole, directly conducts the gas pressure therein to the bore of the paint ball gun for application; the uniqueness and the primary objective of the present invention are that the operation is convenient and the steps of movement procedures can be arranged well to facilitate the air filling.

Another objective of the present invention is to dispose a forced fuse band at the rear lateral end of the said manual wheel, relative to the valve needle, to make the steel jar obtain safe guarantee of pressure load.

DETAILED DESCRIPTION OF THE PREFERRED EMBODIMENTS

Figure 1:
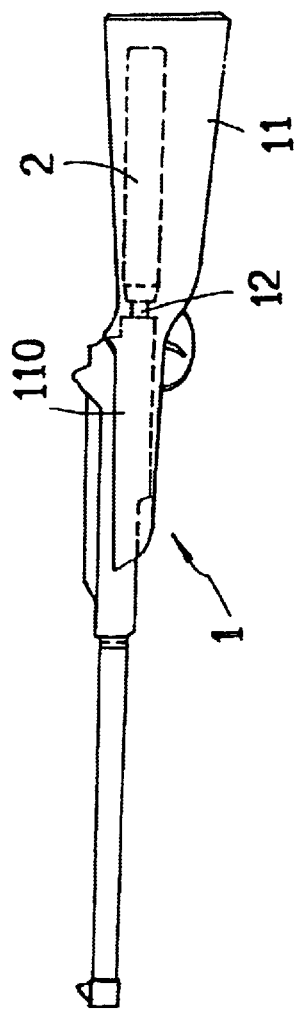
FIG. 1 is a schematic drawing of the basic structure of a paint ball gun.
Figure 2:
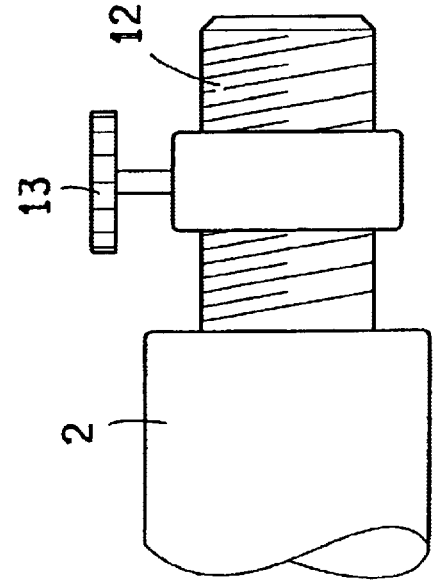
FIG. 2 is a schematic drawing of a valve structure of a conventional steel jar.
Figure 3:
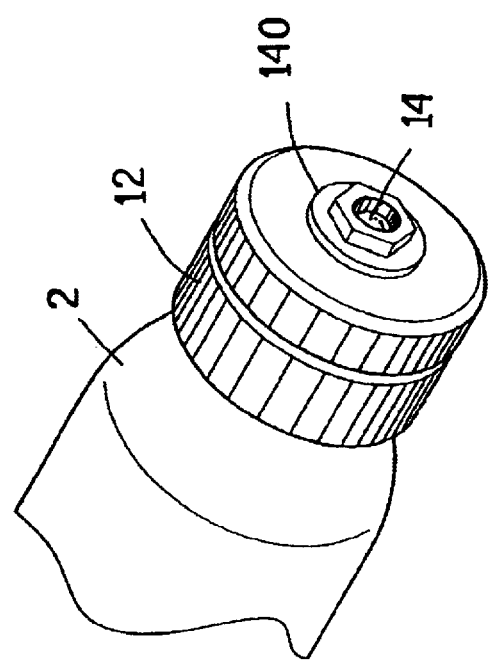
FIG. 3 is another schematic drawing of a valve structure of a conventional steel jar.

The application of a paint ball gun, a steel jar and the introduction of the valve of a conventional steel jar have already been described in detail from FIGS. 1 to 3, therefore they won't be repeated here.

Figure 4:
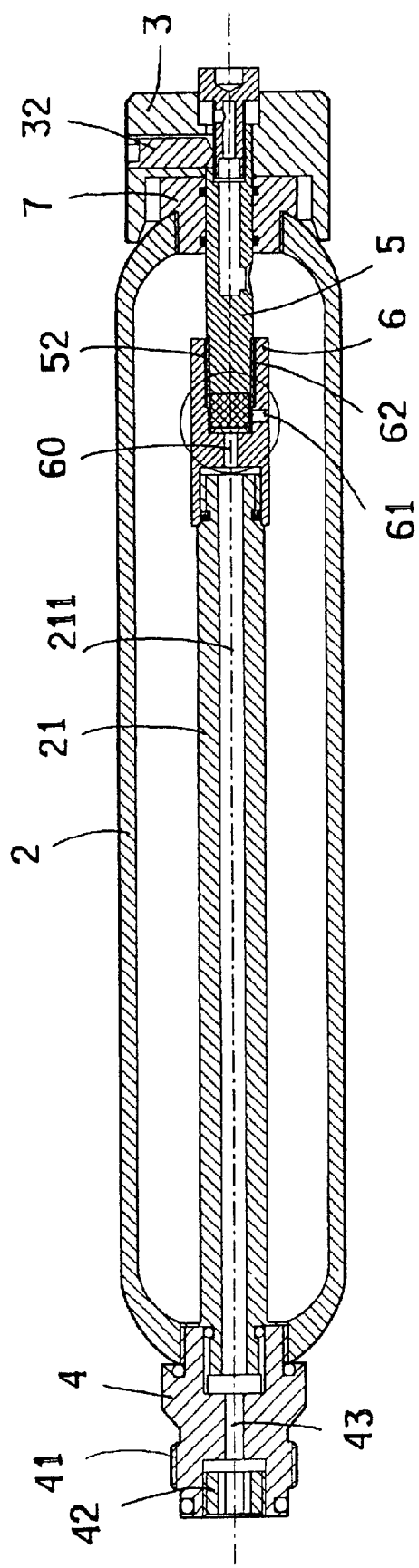
FIG. 4 is a cross-sectional and schematic drawing of the structure of the steel jar of the present invention.
Figure 5:
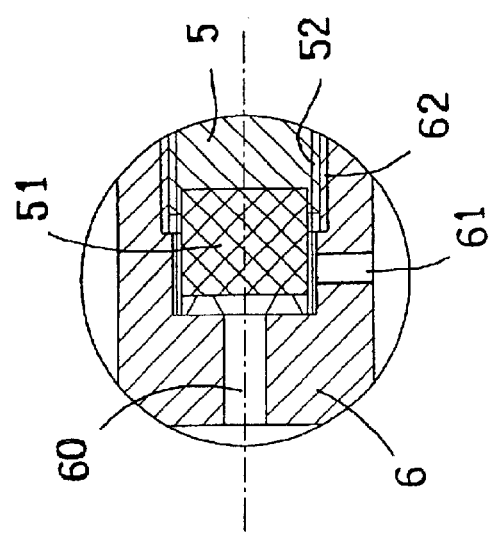
FIG. 5 is a drawing of the relative position between a valve needle and a valve seat of the present invention.

The present invention mainly comprises a steel jar (2), as shown in FIG. 4, disposed forwardly with a joint (4); the said joint (4) has threads (41) for butt jointing a bore (110), as shown in FIG. 1, and a connect hole (43) disposed therein; a filter element (42) is disposed facing the open end of the said connect hole (43); the inside of the joint (4) directly communicates with an axial tube (21); a conduct hole (211) disposed through the inside of the said axial tube (21) communicates with the connect hole (43) of the joint (4); the distal end of the said axial tube (21) connects with a valve seat (6); the said valve seat (6) is disposed with an inner tooth (62) for providing a rotating joint to an outer tooth (52) disposed on the valve needle (5); referring to FIG. 5, on the valve seat (6), relative to a rubber valve (51) disposed at the front end of the valve needle (5), a through hole (61) for conducting the pressure out is disposed in the lateral aspect; the said valve needle (5) provides a outward insertion of a manual wheel (3) via the connection with a wheel shaft (7) at the opposite end of the steel jar (2); on the valve needle (5), relative to the shaft housing surface of the wheel shaft (7), a stop leak ring (71) is tightly adhered to prevent the leakage of the air pressure; the said valve needle (5) situates at the outer end of the steel jar (2) and is relatively locked to the manual wheel (3) by means of a side plug (32); rotating the manual wheel (3) drives the valve needle (5) to make forward and backward displacement inside the valve seat (6); relatively, the forward and backward displacement drives the said rubber valve (51) to plug the said connect hole (60); being retracted, the rubber valve (51) yields to the through hole (61) so as to obtain the communication between the connect hole (60) and the through hole (61), therefore, the gas inside the steel jar (2) alternates with the outside; in other words, the operation of the manual wheel (3) drives the said rubber valve (51) to achieve the on/off effect of the connect hole (60) and further control the release of the said gas pressure or communicate with the said connect hole (60) during gas filling; for the application of filling and releasing the gas, after the joint (4) disposed on the said steel jar (2) is locked to the rear end of the bore (110) disposed on the paint ball gun (1), as shown in FIG. 1, the manual wheel (3) is rotated to open to make the said rubber valve (51) retract for allowing the gas inside the steel jar (2) to flow from the through hole (61) to the connect hole (60); after the filtering or pressure division by a filter element (42), the gas is provided for the bore (110) to use; for refilling when the air pressure inside the said steel jar (2) is used up, similarly, the manual wheel (3) pushes away the said rubber valve (51) to allow the pressurized air source to enter the inside of the said steel jar (2) via both the filter element (42) of the joint (4) disposed on the said steel jar (2) and the connect hole (60); after being filled with the pressurized gas, similarly, the manual wheel (3) is operated in a reverse direction so as to make the linked rubber valve (51) lock and plug the said connect hole (60), thereby to keep the gas inside the steel jar (2) from leaking outward; therefore, the operation of the manual wheel (3) at the rear outer end achieves the dual operational effects of filling or releasing the air for use, furthermore, the adjustment of the manual wheel (3) and the relative adjustment of the interval distance of the aperture of the through hole (61), that is the relative size of the hole channel yielded to the through hole (61), achieve the effect of releasing the air flow amount and enable a further adjustment of the pressure delivery.

Figure 6:
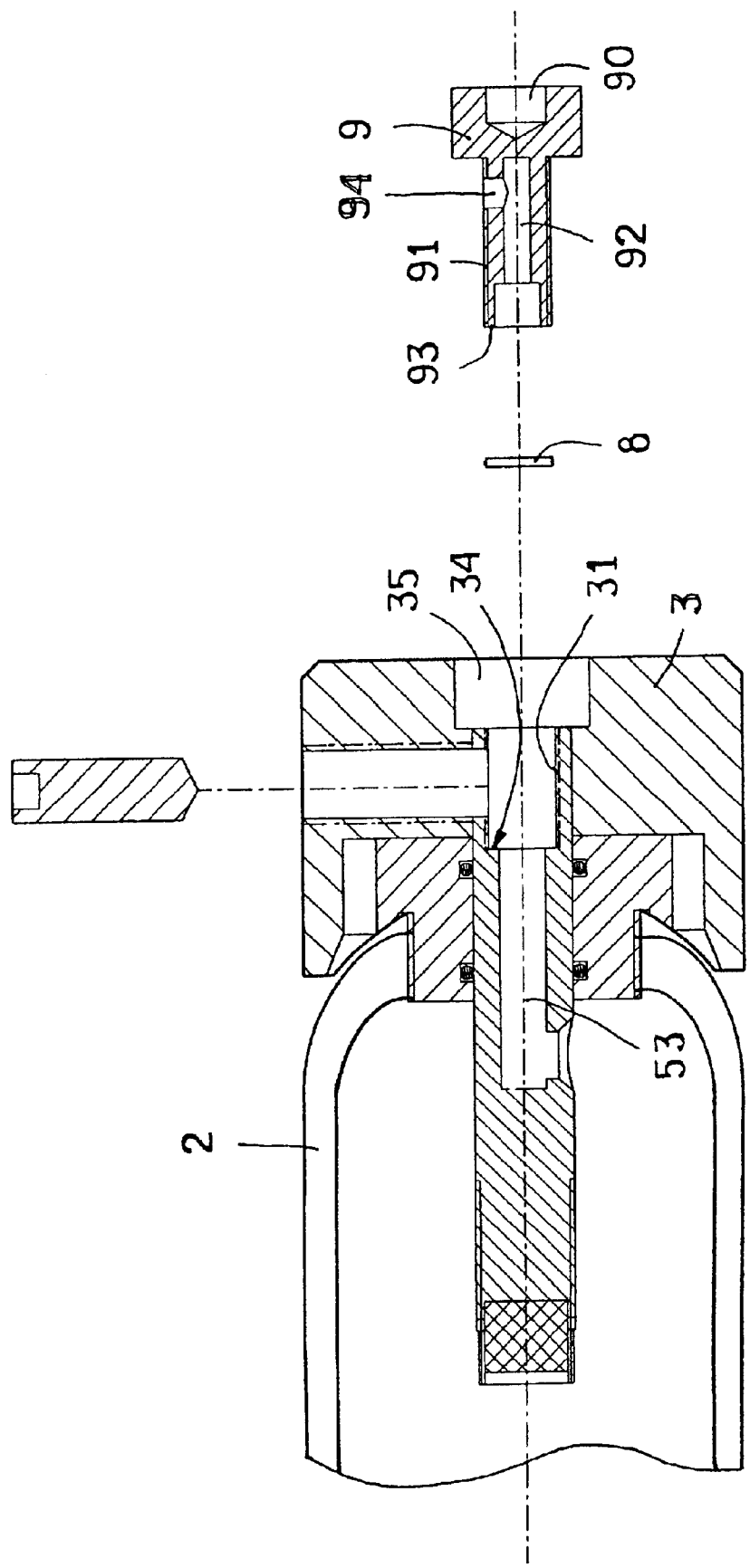
FIG. 6 is a cross-sectional drawing of a fuse device disposed inside a manual wheel of the present invention.
Figure 7:
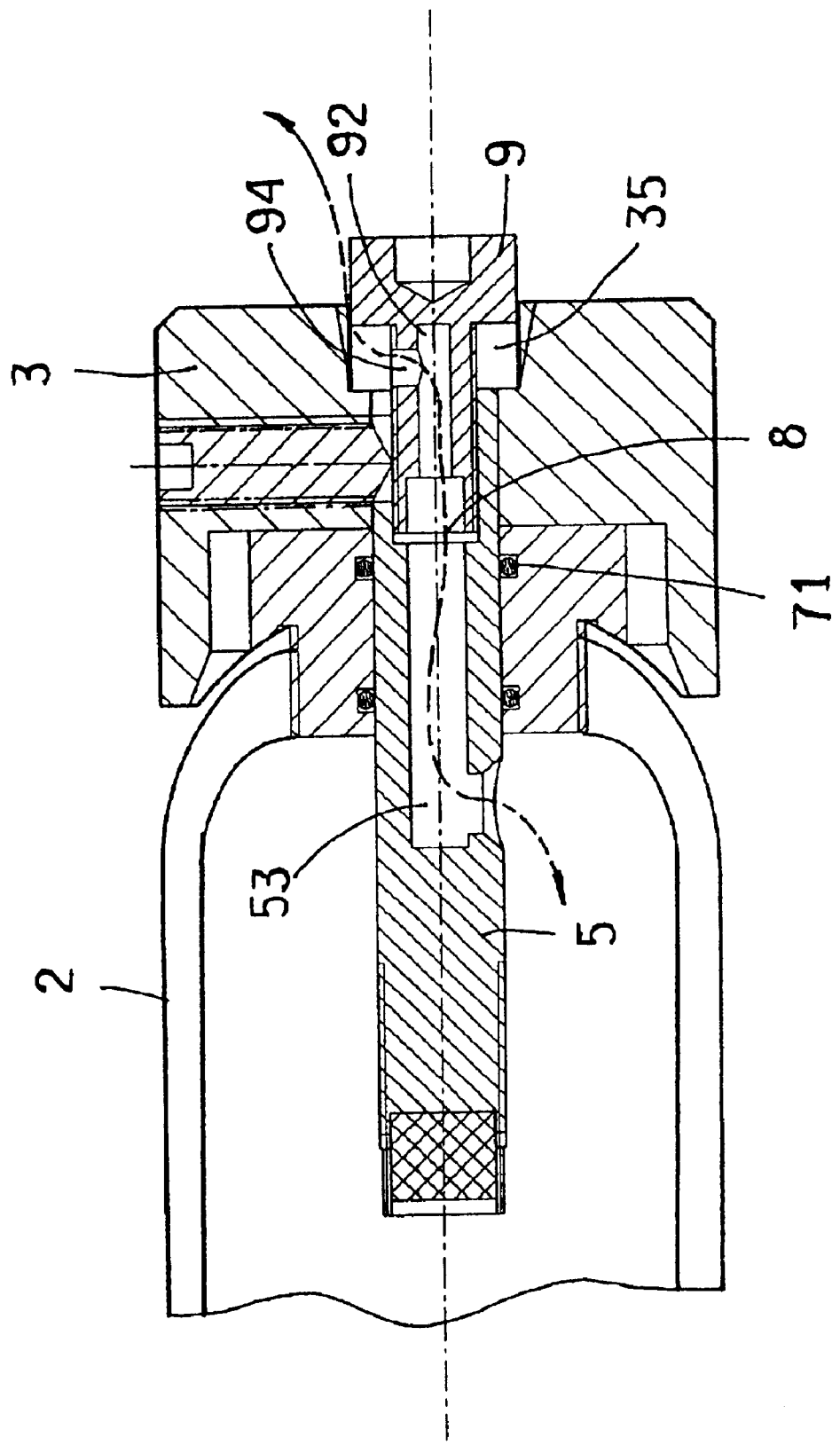
FIG. 7 is a cross-sectional drawing of all the elements of a manual wheel of the present invention.

Referring to FIGS. 6 and 7, the introduction of the fuse application with a steel jar (2), mainly a force conduct hole (53) is disposed axially through the inside of the said manual wheel (3); the said force conduct hole (53) conducts backward to a discharge slot (35); the said discharge slot (35) can be designed as a round shape with a press attach end (34) inserted inside; a band fuse (8) attaches oppositely the inner end plane of the press attach end (34); the discharge slot (35) has an inner tooth (31) thereon; the inner tooth (31) is provided for the rotary disposition of an outer tooth (91) on a lock plug (9); the forward end of the said lock plug (9) is disposed with a press end opening (93); a pressure release slot (92) is axially mounted with a discharge hole (94) conducting outward; therefore, when the said band fuse (8) is located on the inner end plane of the press attach end (34), the outer portion thereof is screwed by the said lock plug (9) to make the said press end opening (93) distance behind the band fuse (8) to press toward the press attach end (34); similarly, the outer rim of the said band fuse (8) is pressed by the said press end opening (93) to tightly attach the press attach end (34); the said band fuse (8) is in a shape of a thin film-like piece; the said piece shape body can be made of any material; however, under too much pressure from the inside of the steel jar (2), the said band fuse (8) tends to break, as shown in FIG. 7; when the band fuse breaks, the air inside the steel jar (2) penetrates the crack of the said band fuse (8) and flows toward the direction of the pressure release slot (92), then the overloaded pressurized gas is discharged toward the outward aspect of the manual wheel (3) through the discharge slot (35).

The bearing pressure of the said band fuse (8) is slightly smaller than that of the steel jar (2) and that makes the band fuse (8) break before the steel jar (2) reaches the critical load, thereby the air pressure discharges outward; the main application is that, when filling the gas, if the pressure from the pressure source is too big, before the steel jar (2) bears the pressure, a safe pressuring fuse effect is obtained first.

What is claimed is:

1. A valve configuration of an air pressure steel jar of a paint ball gun, comprising a steel jar disposed forwardly with a joint; an axial tube is disposed inside the joint and the steel jar; a communicated state exists between the axial tube and the joint; one end of the axial tube is connectively disposed with a valve seat; one end of the valve seat is disposed with a valve needle thereby providing forward and backward rotary movements; a through hole is disposed on the valve seat corresponding to the valve needle; the valve needle is externally operated by a manual wheel to enable communicating or tightly closing between inside and outside of the steel jar.

2. The valve configuration of an air pressure steel jar of a paint ball gun according to claim 1, a conduct structure prepared for outwardly releasing the pressure is disposed on the valve needle, via a force conduct hole distanced by a band fused with pressure resistance slightly smaller than that of the steel jar.

3. The valve configuration of an air pressure steel jar of a paint ball gun according to claim 1, wherein the manual wheel links the valve needle; a stop leak ring is disposed between the valve needle and the steel jar.

4. The valve configuration of an air pressure steel jar of a paint ball gun according to claim 1, wherein the joint disposed at a forward end of the steel jar having a filter element therein.

5. The valve configuration of an air pressure steel jar of a paint ball gun according to claim 1, wherein an outer rim of the joint disposed on the steel jar has threads provided to enable locking with a bore.

6. The valve configuration of an air pressure steel jar of a paint ball gun according to claim 1, wherein a rubber valve is disposed between the valve needle and the valve seat.

* * * * *